April 26, 1932.  T. T. LEONARD  1,855,401
DRY KILN
Filed April 19, 1930   2 Sheets-Sheet 1
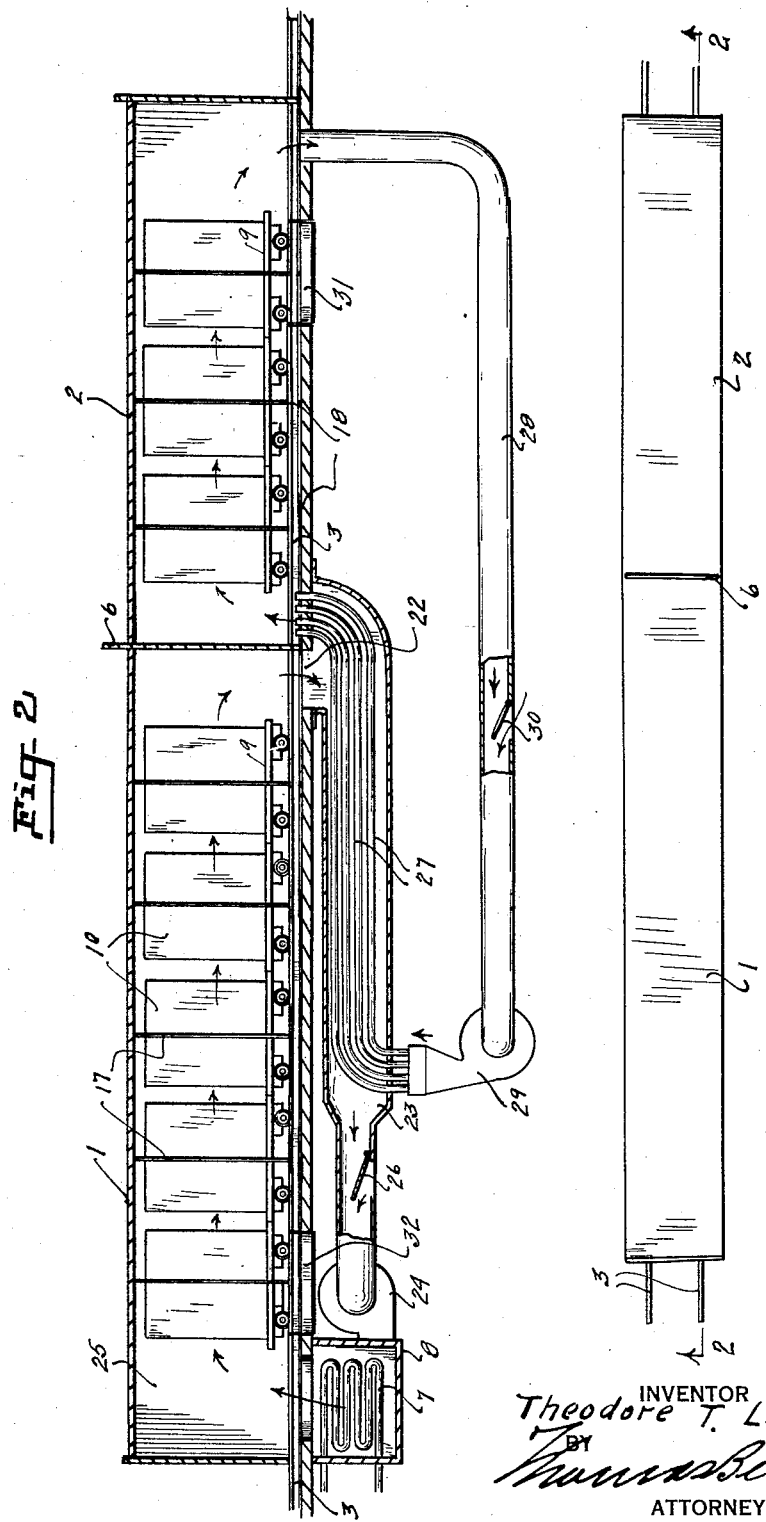
INVENTOR
Theodore T. Leonard
BY
ATTORNEY April 26, 1932.     T. T. LEONARD     1,855,401
DRY KILN
Filed April 19, 1930     2 Sheets-Sheet 2

Theodore T. Leonard
INVENTOR

BY
ATTORNEY

Patented Apr. 26, 1932

1,855,401

UNITED STATES PATENT OFFICE

THEODORE T. LEONARD, OF WINLOCK, WASHINGTON

DRY KILN

Application filed April 19, 1930. Serial No. 445,714.

My invention is primarily intended for use as a dry kiln for the drying of structural members, as handles, that have been heretofore turned but that have not been dried nor surface finished.

It is the general custom in the manufacturing of handles to turn, or partially finish the same, to a rough finish while the same are in a wet, or partially dried condition, because there is less effort required in the turning, and the material from which the handles are to be made may be more easily reduced while in an undried condition.

In the drying of handles and handle stock and in the dehydrating of the materials from which the same are to be made, a large amount of heat is required. If the heated air, for the drying purpose, is maintained in a closed cycle, the air soon becomes so thoroughly saturated with moisture that the drying process cannot be carried on to completion. It is necessary to exhaust the air into the atmosphere. When this is done the heat units contained therein become a total loss.

By my new and improved drying apparatus and the method of accomplishing the same, I provide a relatively tight drying tunnel. Cars carrying the turned handles are placed upon tracks disposed longitudinally of the drying tunnel. Each car engages the side, top and bottom wall of the tunnel in order that the drying air may be forced through and around the handles without providing any escapement channels through which the heated air may flow uninterrupted. A sufficient number of cars are placed within the tunnel to completely saturate the drying air at which point the air is withdrawn from the tunnel and the heat contained therein is extracted and the warmed air thus obtained is readmitted into the entrance end of the tunnel and used for drying purposes. By this means the tunnel is divided into a plurality of compartments and through which the drying air may be circulated in a closed cycle, until the dew point is reached, at which time the air is, or may be, exhausted to the atmosphere and a fresh supply be admitted into a closed cycle. Artificial means are provided for the circulation of the air and for heating the air in the final compartment of the tunnel.

The object of my invention is to provide an efficient dry kiln for the drying of structural members during the manufacturing process.

A further object of my invention consists is providing a tunnel through which air, in varying degrees of temperature, may be circulated. By providing means for forcing the drying air intimately about each of the articles to be dried within the tunnel, the time for completing the drying is greatly reduced.

Still further objects of my invention consists in providing a dry kiln wherein the maximum amount of the heat may be utilized for drying purposes.

Still further objects of my invention consists in providing means whereby the humidity within the drying tunnel may be maintained at the desired amount.

A still further object of my invention consists in placing a scale at the entrance and discharge end of the drying tunnel in order that the amount of moisture remaining in the elements being dehydrated may be definitely known before the car or the material is removed from the drying tunnel. Each car is weighed as the same passes over the scale. The car leaving the tunnel is also placed upon a scale before being discharged from the tunnel to thereby predetermine the actal measurement of the moisture content of each car of material that has been eliminated and the proper time to remove the car from the tunnel.

With these and incidental objects in view, the invention consists in certain novel features of construction and combination of parts, the essential elements of which are set forth in the appended claim, and a preferred form of embodiment of which is hereinafter shown with reference to the drawings which accompany and form a part of this specification.

In the drawings:

Fig. 1 is a top, plan view of the assembled device.

Fig. 2 is a sectional, side view of the assembled device.

Like reference characters refer to like parts throughout the several views.

Figure 3:
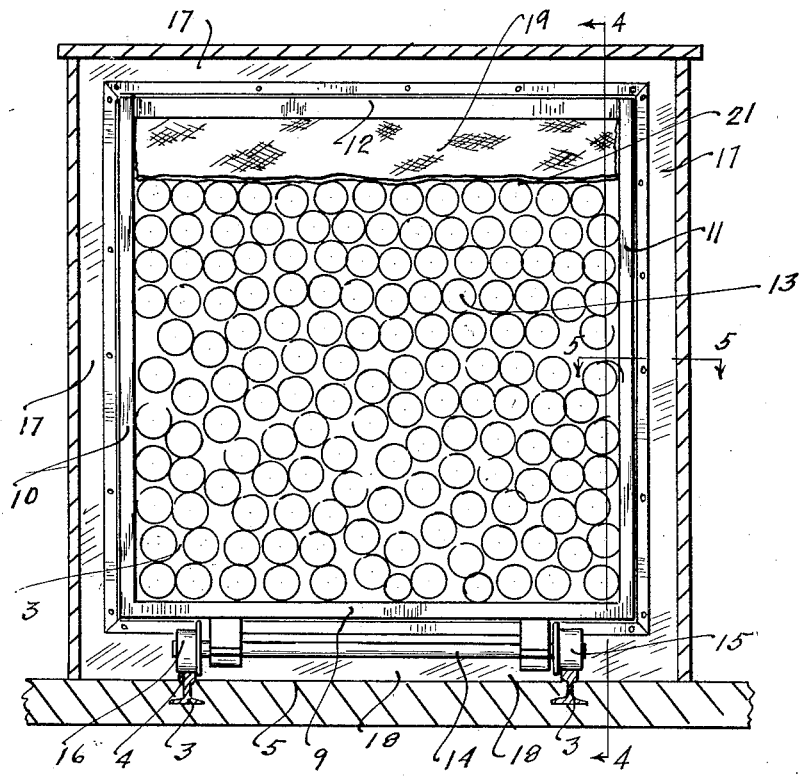
Fig. 3 is a sectional, end view of the assembled device, taken on line 3—3 of Fig. 4, looking in the direction indicated.
Figure 5:
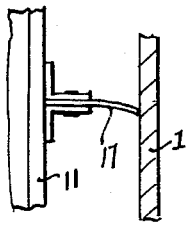
Fig. 5 is a horizontal section showing the flexible member on the frame taken on line 5—5 of Fig. 3.
Figure 4:
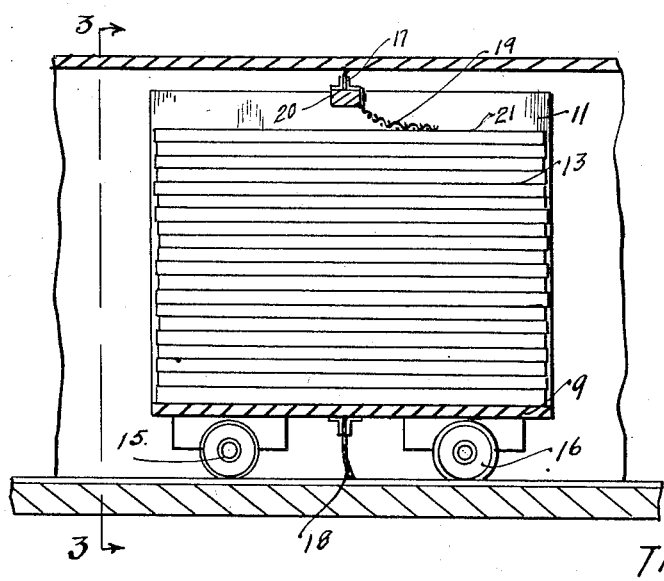
Fig. 4 is a fragmentary, sectional, side view of the device.

My device is primarily intended for the dehydrating, or kiln drying of structural members which are adapted for being placed, or loaded into cars and transferred through a drying tunnel upon the cars, means being provided for the forcing of the drying medium longitudinally of the cars and longitudinally through the mass of structural members that are to be kiln dried.

In my new and improved method, I divide the drying tunnel into a plurality of chambers each of which is adapted for having the drying air circulated therethrough by power means.

In preferred embodiment I show my drying tunnel as illustrated in Fig. 1 as being composed of two sections 1 and 2 with a railway track 3 running longitudinally of the drying tunnel. The top 4 of the rail members forming the track are substantially flush with the lower surface 5 of the dry kiln. A movable hand manipulative diphragm 6 is disposed between the tunnel sections 1 and 2, the same being adapted for entirely separating one of the sections from the other. A battery of steam pipes 7 are disposed within a steam chest 8 and air for drying is forced through the battery of steam coils and is heated to the desired intensity. Cars are adapted for being moved longitudinally of the tunnel and for being moved upon the tracks disposed longitudinally thereof. Each of the cars are made of a structural frame comprised of a base 9, side walls 10 and 11, and a top 12 and the structural members to be dried, as turned handles 13, are placed longitudinally of the car and longitudinally of the drying tunnel through which the same are to be transported. Axles 14 are disposed within suitable bearings provided at the base of the car members with flanged wheels 15 and 16 being disposed upon the axles and of a suitable gauge to rest upon the rails comprising the track. The inside walls of the drying kiln are preferably made smooth and of uniform alignment to produce a cross sectional dimension that is the same. A flexible member 17 surrounds the frame and is made to engage the side and top walls of the dry kiln tunnel. An apron 18 downwardly extends from the base of the car and is made to engage the bottom of the dry kiln. In the sizes of the cars in general use for this purpose and where broom and mop handles are being kiln dried, the stack placed within the car will shrink a number of inches. Since it is desirable that the heated air be forced entirely through the mass disposed upon the car and longitudinally of the mass, I suspend a flexible shield 19 from the cross rail 20 of the car and let the same rest upon the top 21 of the pile of structural members to be kiln dried. As the shrinkage occurs in the drying process the flexible members follow the top of the pile and therefore maintains a relatively air tight contact between the top of the pile and the cross bar of the car and prevents the free flowing of the heated air through the tunnel. An outlet 22 is placed through the wall of the tunnel and air is drawn therethrough into the pipe 23. A fan 24 is disposed within the pipe line for sucking the air through the pipe. The fan forces the air in a closed cycle past the steam coils and through the drying tunnel 25. When it is desired to trap out the air being circulated within the tunnel for any reason, the same may be accomplished by the placing of a trap 26 within the line.

Heretofore the heated air became moisture laden before the total heat content of the air had been absorbed in the drying operation. In my new and improved device I divide my tunnel into a plurality of compartments, the same being separated by a diaphragm 6. The pipe 23 is swelled at its tunnel end. I run a plurality of pipes 27 through the enlarged end. The pipes 27 are relatively thin-walled to facilitate the extracting of the heat from the air passing through the swelled portion of the pipe 23. This air is then circulated through the remaining compartment of the dry kiln in which cars loaded with materials are being progressed. This air may be circulated through the remaining portion of the kiln in a closed cycle by being passed through the pipe 28. The induction is caused by any suitable means as by an induction fan 29. If, for any reason, it is found desirable to dissipate any part of the air within the closed cycle, the same may be trapped out through a by-pass 30.

I have found it desirable to weigh the cars at the entrance end of the dry kiln and predetermine the amount of gross weight of the material being placed upon the cars. I do this by placing a scale 31 in the line of travel of the cars. This enables me to know the gross weight of the material placed upon the car at the entrance to the dry kiln. I place a second scale 3 at the discharge end of the dry kiln and over which each of the cars pass. When the dehydration has reached the desired amount, the car is then removed from the dry kiln.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What I claim is:

A device for drying handles comprising a tunnelway, a plurality of cars having handles disposed therein disposed within tunnelway, an apron downwardly extending from the bottom of each car, a flexible member disposed upon each side and top of each of the cars adapted to contact with the sides and top of the tunnelway, a flexible shield downwardly extending from the ceiling of each of the cars adapted to maintain a steady flow of heat through the handles disposed in the cars, and a heating chamber disposed below and at one end of the tunnelway.

THEODORE T. LEONARD.